United States Patent
Wang et al.

(10) Patent No.: US 10,260,405 B2
(45) Date of Patent: Apr. 16, 2019

(54) FUEL INJECTION CONTROL OF A TURBOCHARGED INTERNAL COMBUSTION ENGINE

(71) Applicant: GM GLOBAL TECHNOLOGY OPERATIONS LLC, Detroit, MI (US)

(72) Inventors: Yue-Yun Wang, Troy, MI (US);
Martin Suchy, Rheinland-Pfalz (DE);
Joerg Bernards, Katzenelnbogen (DE)

(73) Assignee: GM Global Technology Operations LLC, Detroit, MI (US)

( * ) Notice: Subject to any disclaimer, the term of this patent is extended or adjusted under 35 U.S.C. 154(b) by 65 days.

(21) Appl. No.: 15/496,819

(22) Filed: Apr. 25, 2017

(65) Prior Publication Data

US 2018/0306102 A1    Oct. 25, 2018

(51) Int. Cl.
| | | |
|---|---|---|
| *F02B 37/16* | (2006.01) | |
| *F02B 37/22* | (2006.01) | |
| *F02B 37/18* | (2006.01) | |

(52) U.S. Cl.
CPC ............ *F02B 37/186* (2013.01); *F02B 37/16* (2013.01); *F02B 37/18* (2013.01); *F02B 37/22* (2013.01); *F05B 2220/40* (2013.01); *Y02T 10/144* (2013.01)

(58) Field of Classification Search
CPC ... F02B 37/14; F02D 2200/00; F02D 41/0007

USPC .......................................................... 60/601
See application file for complete search history.

(56) References Cited

U.S. PATENT DOCUMENTS 9,291,093 B2 *   3/2016   Wang ..................... F02B 37/12
9,879,593 B2 *   1/2018   Wang ..................... F02B 37/18

* cited by examiner

*Primary Examiner* — Patrick D Maines
*Assistant Examiner* — Edward Bushard
(74) *Attorney, Agent, or Firm* — Quinn IP Law

(57) ABSTRACT

An internal combustion engine has a cylinder configured to combust an air-fuel mixture and expel an exhaust gas and a turbocharger for generating a pressurized airflow to the cylinder. The turbocharger includes a turbine scroll defining an inlet and an outlet, an exhaust gas driven rotating assembly having a turbine wheel disposed inside the turbine scroll, and a waste-gate defining an opening. A first sensor detects turbine outlet pressure. A second sensor detects turbine inlet temperature. A controller determines an effective area of the waste-gate opening and an exhaust gas mass flow-rate. The controller also determines a turbine inlet pressure in response to the detected turbine outlet pressure and the turbine inlet temperature, and the determined waste-gate opening effective area and the exhaust gas mass flow-rate. The controller additionally regulates a supply of fuel to the cylinder corresponding to the pressurized airflow affected by the determined turbine inlet pressure.

18 Claims, 3 Drawing Sheets

FUEL INJECTION CONTROL OF A TURBOCHARGED INTERNAL COMBUSTION ENGINE

INTRODUCTION

The present disclosure relates to a system and method for controlling an internal combustion engine employing a waste-gated turbocharger.

Internal combustion engines (ICE) are often called upon to generate considerable levels of power for prolonged periods of time on a dependable basis. Many such ICE assemblies employ a supercharging device, such as an exhaust gas turbine driven turbocharger, to compress the airflow before it enters the intake manifold of the engine in order to increase power and efficiency.

Specifically, a turbocharger is a centrifugal gas compressor that forces more air and, thus, more oxygen into the combustion chambers of the ICE than is otherwise achievable with ambient atmospheric pressure. The additional mass of oxygen-containing air that is forced into the ICE improves the engine's volumetric efficiency, allowing it to burn more fuel in a given cycle, and thereby produce more power. Frequently, such turbochargers are driven by the engine's exhaust gas.

A typical exhaust gas driven turbocharger includes a central shaft that is supported by one or more bearings and that transmits rotational motion between a turbine wheel and an air compressor wheel. Both the turbine and compressor wheels are fixed to the shaft, which in combination with various bearing components constitute the turbocharger's rotating assembly. Turbochargers frequently employ waste-gate valves to limit operational speeds of the rotating assembly in order to maintain turbocharger boost within prescribed limits and prevent rotating assembly over speed.

SUMMARY

One embodiment of the disclosure is directed to an internal combustion engine having a cylinder configured to receive a mixture of air and fuel for combustion therein and expel an exhaust gas following the combustion and a fuel injector configured to supply the fuel. The engine also includes a turbocharger configured to receive ambient air and generate a pressurized airflow for delivery to the cylinder. The turbocharger includes a compressor scroll, a turbine scroll defining a turbine inlet and a turbine outlet, a rotating assembly driven by the exhaust gas and having a turbine wheel disposed inside the turbine scroll and a compressor wheel disposed inside the compressor scroll, and a waste-gate defining an opening configured to selectively redirect at least a portion of the exhaust gas to the turbine outlet in bypass of, i.e., bypassing, the turbine wheel.

The engine also includes a first sensor configured to detect a pressure at the turbine outlet, a second sensor configured to detect a temperature at the turbine inlet, and a controller in communication with the first sensor, second sensor, and the fuel injector. The controller is configured to determine an effective area of the waste-gate opening and a mass flow-rate of the exhaust gas. The controller is also configured to determine a pressure at the turbine inlet in response to the detected pressure at the turbine outlet and temperature at the turbine inlet, and the determined effective area of the waste-gate opening and mass flow-rate of the exhaust gas. The controller is additionally configured to command the fuel injector to supply an amount of fuel to the cylinder based on the amount of air charge into the cylinder and which is affected by and corresponds to the determined pressure at the turbine inlet.

The controller may be programmed with a first lookup table correlating the turbine inlet pressure to the detected pressure at the turbine outlet and temperature at the turbine inlet, and the determined effective area of the waste-gate opening and mass flow-rate of the exhaust gas. In such a case, the controller may be further configured to determine the pressure at the turbine inlet via the first lookup table.

The controller may be configured to determine the pressure at the turbine inlet using a second order polynomial function.

The second order polynomial function may include a factor indicative of the determined effective area of the waste-gate opening.

The waste-gate may include a variable position valve configured to regulate the effective area of the waste-gate opening. In such a case, the factor indicative of the determined effective area of the waste-gate opening may be defined by a current position of the valve.

The rotating assembly of the turbocharger may be driven by the exhaust gas at a rotational speed, while the second order polynomial function may include a factor indicative of the rotational speed of the rotating assembly.

The controller may be programmed with a second lookup table correlating the rotational speed of the rotating assembly to a mass flow-rate of air through the compressor and a compressor pressure ratio. Consistent with the disclosure, the controller may be further configured to determine a current rotational speed of the rotating assembly via the second lookup table.

The compressor scroll may define a compressor inlet and a compressor outlet. The engine may additionally include a third sensor configured to detect a temperature at the compressor outlet, a fourth sensor configured to detect a pressure at the compressor outlet, and a fifth sensor configured to detect a pressure at the compressor inlet. The controller may be further configured to determine the pressure at the turbine inlet in response to the detected temperature and pressure at the compressor outlet, and the detected pressure at the compressor inlet.

The compressor scroll may define a compressor inlet and a compressor outlet. The controller may be further configured to determine a power of the compressor wheel and then determine the pressure at the turbine inlet in response to the determined power of the compressor wheel.

The controller may also be programmed with a third lookup table correlating the power of the compressor wheel to a corrected rotational speed of the rotating assembly and a corrected mass flow-rate of air through the compressor. In such case, the controller may be further configured to determine the power of the compressor wheel via the third lookup table.

Another embodiment of the present disclosure is directed to a method of controlling an internal combustion engine described above.

The above features and advantages, and other features and advantages of the present disclosure, will be readily apparent from the following detailed description of the embodiment(s) and best mode(s) for carrying out the described disclosure when taken in connection with the accompanying drawings and appended claims.

DETAILED DESCRIPTION

Figure 1:
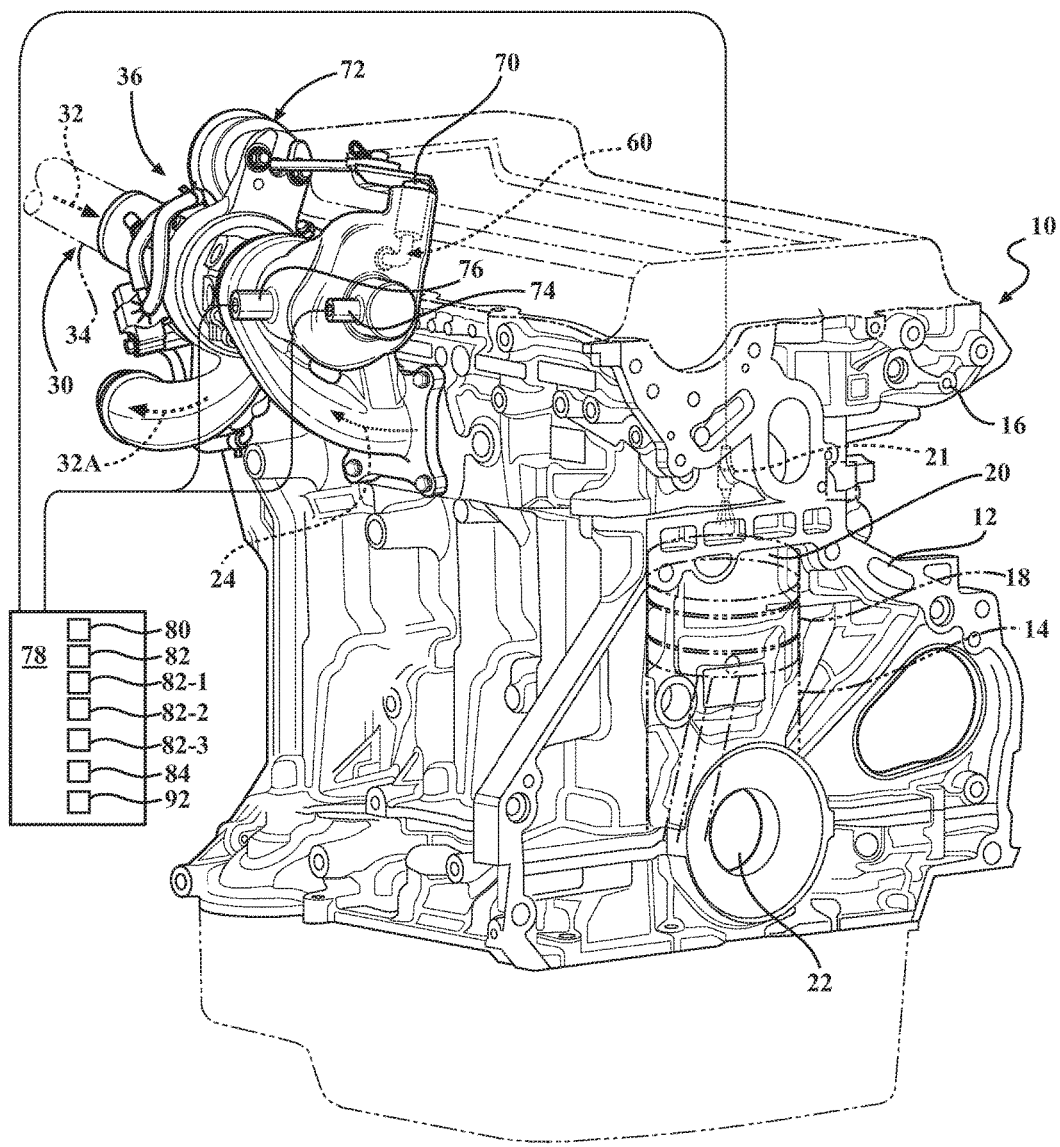
FIG. 1 is a perspective view of an internal combustion engine including a turbocharger according to the disclosure.

Referring to the drawings wherein like reference numbers correspond to like or similar components throughout the several figures, FIG. 1 illustrates an internal combustion engine 10. The engine 10 also includes a cylinder block 12 with a plurality of cylinders 14 arranged therein. As shown in FIG. 1, the engine 10 may also include a cylinder head 16 that is mounted on the cylinder block 12. Each cylinder 14 includes a piston 18 configured to reciprocate therein.

Combustion chambers 20 are formed within the cylinders 14 between the bottom surface of the cylinder head 16 and the tops of the pistons 18. Generally, each of the combustion chambers 20 receives fuel and air from the cylinder head 16 that form a fuel-air mixture for subsequent combustion inside the subject combustion chamber. The fuel is supplied to each of the cylinders via a respective fuel injector 21. The cylinder head 16 is also configured to exhaust post-combustion gas from the combustion chambers 20. The engine 10 also includes a crankshaft 22 configured to rotate within the cylinder block 12. The crankshaft 22 is rotated by the pistons 18 as a result of an appropriately proportioned fuel-air mixture being burned in the combustion chambers 20. After the air-fuel mixture is burned inside a specific combustion chamber 20, the reciprocating motion of a particular piston 18 serves to expel post-combustion exhaust gas 24 from the respective cylinder 14 following the combustion.

The engine 10 additionally includes an induction system 30 configured to channel an airflow 32 from the ambient to the cylinders 14. The induction system 30 includes an intake air duct 34, a turbocharger 36, and an intake manifold (not shown). Although not shown, the induction system 30 may additionally include an air filter upstream of the turbocharger 36 for removing foreign particles and other airborne debris from the ambient airflow 32. The turbocharger 36 is in fluid communication with the cylinders 14. Specifically, the intake air duct 34 is configured to channel the airflow 32 from the ambient to the turbocharger 36, while the turbocharger is configured to pressurize the received airflow, and discharge pressurized airflow 32A to the intake manifold. The intake manifold in turn distributes the previously pressurized airflow 32 to the cylinders 14 for mixing with an appropriate amount of fuel and subsequent combustion of the resultant fuel-air mixture.

Figure 2:
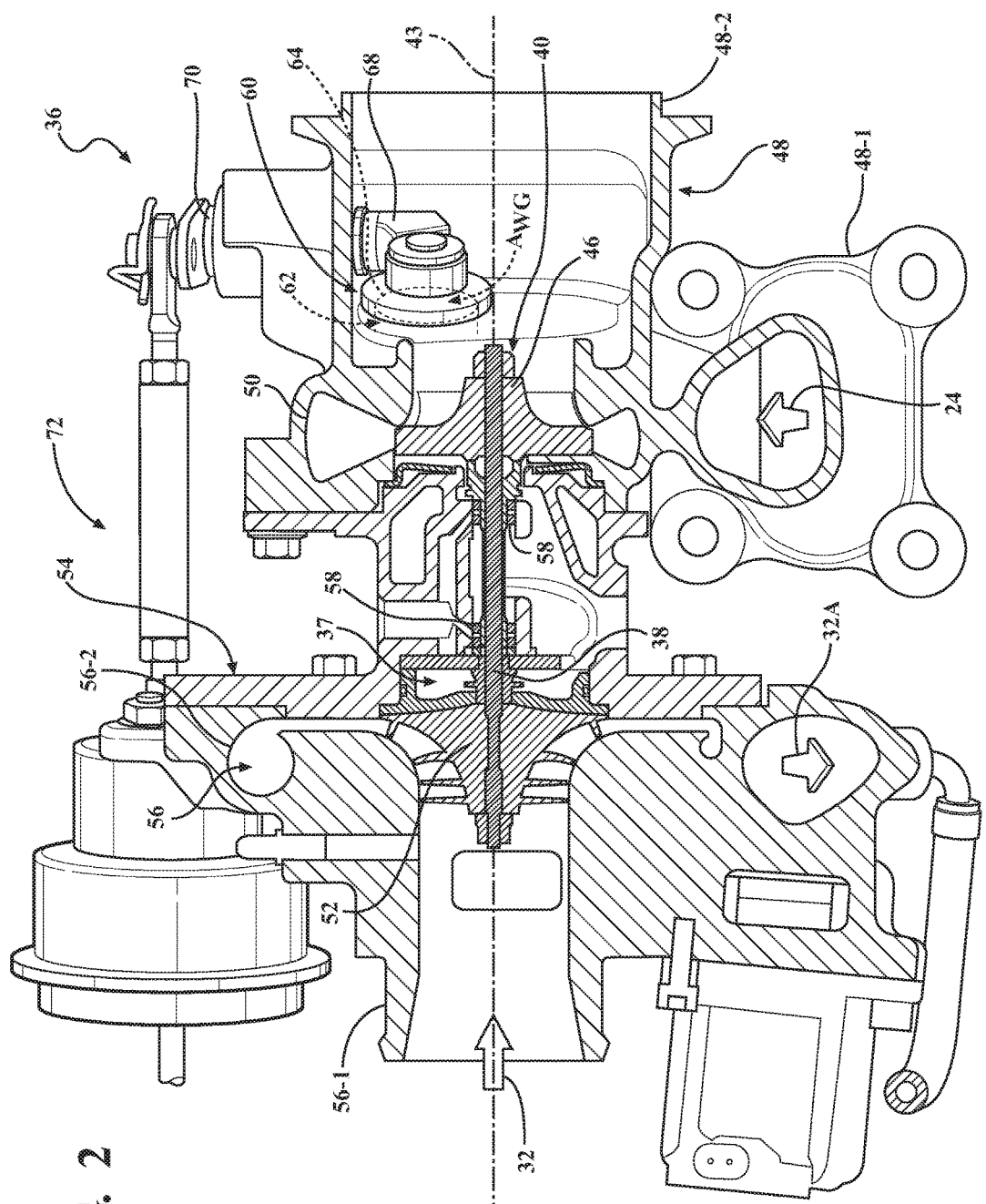
FIG. 2 is a perspective partial cross-sectional view of the turbocharger shown in FIG. 1, showing a waste-gate assembly that includes a valve, an actuator, and a turbine wheel bypass.

As shown in FIG. 2, the turbocharger 36 includes a rotating assembly 37. The rotating assembly 37 includes a shaft 38 having a first end 40 and a second end 42. The rotating assembly 37 also includes a turbine wheel 46 mounted on the shaft 38 proximate to the first end 40 and configured to be driven, i.e., rotated along with the shaft 38 about an axis 43, by the exhaust gas 24 emitted from the cylinders 14. The turbine wheel 46 is disposed inside a turbine housing 48 that includes a turbine volute or scroll 50, wherein the entire assembly is generally identified as a turbine. The turbine scroll 50 receives the post-combustion exhaust gas 24 at a turbine inlet 48-1 and directs the exhaust gas to the turbine wheel 46. After the turbine wheel 46, the exhaust gas 24 is directed through a turbine outlet 48-2 into an exhaust system (not shown). The turbine scroll 50 is configured to achieve specific performance characteristics, such as efficiency and response, of the turbocharger 36. As further shown in FIG. 2, the rotating assembly 37 also includes a compressor wheel 52 mounted on the shaft 38 between the first and second ends 40, 42.

The compressor wheel 52 is configured to pressurize the ambient airflow for eventual delivery to the cylinders 14. The compressor wheel 52 is disposed inside a compressor housing or cover 54 that includes a compressor volute or scroll 56, wherein the entire assembly is generally identified as a compressor. The compressor scroll 56 receives the ambient airflow 32 at a compressor inlet 56-1 and directs the airflow to the compressor wheel 52 for pressurization. After the compressor wheel 52, the pressurized airflow 32A is directed through a compressor outlet 56-2 toward the cylinders 14. The compressor scroll 56 is configured to achieve specific performance characteristics, such as peak airflow and efficiency of the turbocharger 36. Accordingly, rotation is imparted to the shaft 38 by the exhaust gas 24 energizing the turbine wheel 46, and is in turn communicated to the compressor wheel 52 owing to the compressor wheel being fixed on the shaft.

The rotating assembly 37 is supported for rotation about the axis 43 via journal bearings 58. During operation of the turbocharger 36, the rotating assembly 37 may frequently operate at speeds over 100,000 revolutions per minute (RPM) while generating boost pressure for engine 10, i.e., pressurizing the ambient airflow 32 for delivery of the pressurized airflow 32A to the cylinders 14. Furthermore, the variable flow and force of the exhaust gas 24 influences the amount of boost pressure that may be generated by the compressor wheel 52 throughout the operating range of the engine 10.

With continued reference to FIG. 2, the turbocharger 36 includes a waste-gate 60. The waste-gate 60 may either be internal, built-in to the turbocharger 36, or an external to the turbocharger arrangement. The waste-gate 60 includes a passage 62 that defines an opening 64 configured to selectively redirect at least a portion of the exhaust gas 24 from the turbine inlet 48-1 to the turbine outlet 48-2 in bypass of the turbine wheel 46. Permitting some of the exhaust gas 24 to bypass the turbine wheel 46 serves to limit rotational speed of the rotating assembly 37 and pressure of the airflow 32 received from the ambient. The waste-gate 60 also includes a variable position valve 68 fixed to a rotatable shaft 70. As shown, the shaft 70 is rotated by an actuator 72, thereby shifting the valve 68 relative to the passage 62 and changing an effective area $A_{wg}$ of the waste-gate opening 64, i.e., an area of the actual or operative opening through which the exhaust gas 24 may bypass the turbine wheel 46.

Figure 3:
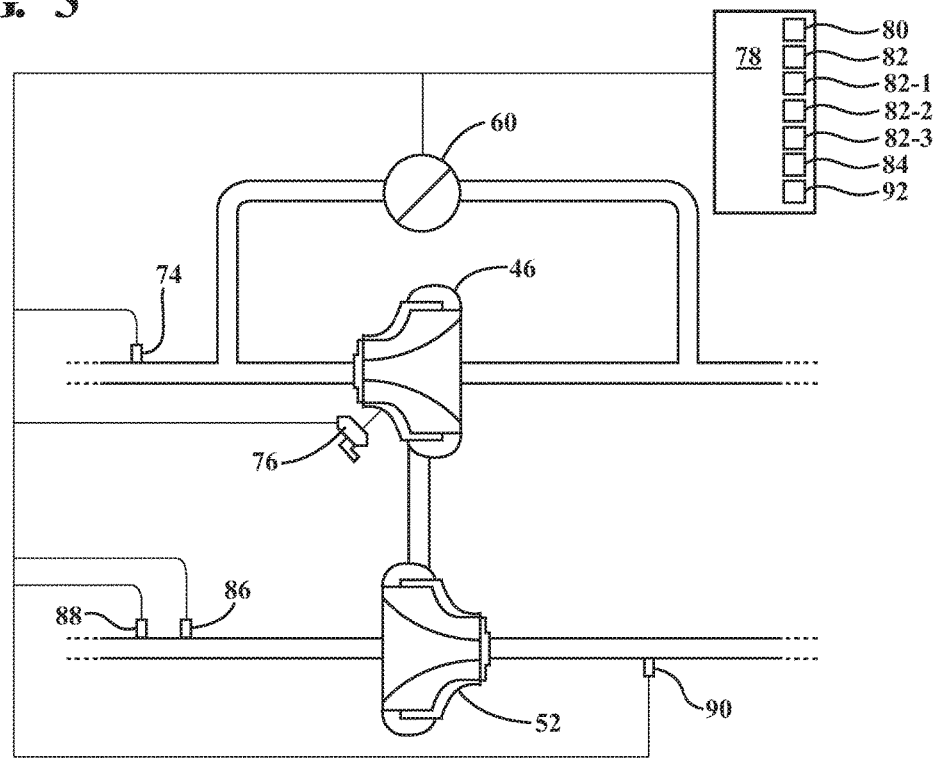
FIG. 3 is a schematic illustration of intake air and exhaust gas flows in a representative turbocharger, such as shown in FIGS. 1 and 2.

As shown in FIGS. 1 and 3, the engine 10 also includes a first sensor 74 configured to detect a pressure $P_{to}$ at the turbine outlet 48-2 and a second sensor 76 configured to detect a temperature at the turbine inlet $T_{ti}$, which may also be estimated using a model. The engine 10 additionally includes an electronic controller 78 in operative communication with the fuel injector 21 for regulating injection of the fuel and the actuator 72 to regulate position of the valve 68. The controller 78 is also in communication with, i.e., is configured to receive signals from, the first sensor 74 and the second sensor 76. The controller 78 is configured, i.e., constructed and programmed, to regulate operation of the engine 10, including operation of the fuel injector 21. In an embodiment where the engine 10 is installed in a vehicle (not shown), the controller 78 may be configured as a central processing unit (CPU) intended to regulate other vehicle systems in addition to the operation of the engine 10. In order to appropriately control operation of the engine 10 and other vehicle systems, the controller 78 may include a memory, at least some of which is tangible and non-transitory. The memory may be any recordable medium that participates in providing computer-readable data or process instructions. Such a medium may take many forms, including but not limited to non-volatile media and volatile media.

Non-volatile media for the controller 78 may include, for example, optical or magnetic disks and other persistent memory. Volatile media may include, for example, dynamic random access memory (DRAM), which may constitute a main memory. Such instructions may be transmitted by one or more transmission medium, including coaxial cables, copper wire and fiber optics, including the wires that comprise a system bus coupled to a processor of a computer. Memory of the controller 78 may also include a floppy disk, a flexible disk, hard disk, magnetic tape, any other magnetic medium, a CD-ROM, DVD, any other optical medium, etc. The controller 78 may be configured or equipped with other required computer hardware, such as a high-speed clock, requisite Analog-to-Digital (A/D) and/or Digital-to-Analog (D/A) circuitry, any input/output circuitry and devices (I/O), as well as appropriate signal conditioning and/or buffer circuitry. Any algorithms required by the controller 78 or accessible thereby may be stored in the memory and automatically executed to provide the required functionality.

The controller 78 is specifically configured to determine the effective area $A_{wg}$ of the waste-gate opening 64 and a mass flow-rate $\dot{m}_{eg}$ of the exhaust gas 24. The mass flow-rate $\dot{m}_{eg}$ of the exhaust gas 24 is the total flow rate of the exhaust gas including the exhaust gas flow rate through the turbine scroll 50 and the flow rate through the waste-gate 60. The exhaust gas mass flow-rate $\dot{m}_{eg}$ determination may be based on an empirical model programmed in to the controller 78 or be based on specific measurements via dedicated sensors (not shown). The controller 78 is also configured to determine a pressure $P_{ti}$ at the turbine inlet 48-1 in response to the detected turbine outlet pressure $P_{to}$ and turbine inlet temperature $T_{ti}$, as well as the determined waste-gate opening effective area $A_{wg}$ and exhaust gas mass flow rate $\dot{m}_{eg}$. Additionally, the controller 78 is configured to command the fuel injector 21 to supply a specific amount of fuel to the cylinders 14 that corresponds to mass of the airflow 32 channeled into the cylinders, which is affected by, and, therefore, also corresponds to the determined turbine inlet pressure $P_{ti}$.

As shown in FIG. 3, the controller 78 may be programmed with a first lookup table 80 compiled empirically during testing of the turbocharger 36 on a test stand or as part of the engine 10. The first lookup table 80 correlates the turbine inlet pressure $P_{ti}$ to the detected turbine outlet pressure $P_{to}$ and turbine inlet temperature $T_{ti}$, and the determined waste-gate opening effective area $A_{wg}$ and exhaust gas mass flow rate $\dot{m}_{eg}$. Accordingly, the controller 78 may be configured to determine the turbine inlet pressure $P_{ti}$ via accessing the first lookup table 80. In a separate embodiment, the controller 78 may be configured to determine the turbine inlet pressure $P_{ti}$ using a second order polynomial function generally referenced by numeral 82. Generally, the second order polynomial function 82 may be expressed as follows:

$$P_{ti} = P_{to} f\left(\frac{\dot{m}_{eg}\sqrt{T_{ti}}}{P_{to}}, F\right) \quad (82)$$

In the function 82, the factor $$\text{``}\frac{\dot{m}_{eg}\sqrt{T_{ti}}}{P_{to}}\text{''}$$

generally designates a corrected mass flow rate of the exhaust gas 24, while the factor "F" generally designates a specific physical parameter of the turbocharger 36.

An embodiment 82-1 of the second order polynomial function 82 may include a factor indicative of the determined effective area $A_{wg}$ of the waste-gate opening 64. Specifically, the factor indicative of the determined effective area $A_{wg}$ of the waste-gate opening 64 may be defined by a current position $u_{wg}$ of the valve 68, for example, correlated to the current position $u_{wg}$ by the controller 78. Accordingly, the embodiment 82-1 of the second order polynomial function 82 using the current position $u_{wg}$ of the valve 68 may be expressed and programmed into the controller 78 as follows:

$$P_{ti} = P_{to}\left(a_0 + a_1\left(\frac{\dot{m}_{eg}\sqrt{T_{ti}}}{P_{to}}\right) + a_2 u_{wg} + a_3\left(\frac{\dot{m}_{eg}\sqrt{T_{ti}}}{P_{to}}\right)^2 + a_4(u_{wg})^2 + a_5\left(\frac{\dot{m}_{eg}\sqrt{T_{ti}}}{P_{to}}\right)u_{wg}\right) \quad (82\text{-}1)$$

In the embodiment 82-1 of the polynomial function 82, as well as other embodiments of the function to be discussed in detail below, $a_1$ through as are constants. The constants $a_1$ through as are based on specific characteristics of the turbocharger 36, which may be determined empirically during actual testing of the turbocharger or via computational modeling thereof.

During boosted operation of the engine 10, the rotating assembly 37 is driven by the exhaust gas 24 at a rotational speed $\omega_T$, typically identified as turbocharger or compressor speed. Another embodiment 82-2 of the second order polynomial function 82 may include a factor indicative of the rotational speed $\omega_T$ of the rotating assembly 37, and may be expressed and programmed into the controller 78 as follows:

$$P_{ti} = P_{to}\left(a_0 + a_1\left(\frac{\dot{m}_{eg}\sqrt{T_{ti}}}{P_{to}}\right) + a_2\left(\frac{\omega_T}{\sqrt{T_{ti}}}\right) + a_3\left(\frac{\dot{m}_{eg}\sqrt{T_{ti}}}{P_{to}}\right)^2 + a_4\left(\frac{\omega_T}{\sqrt{T_{ti}}}\right)^2 + a_5\left(\frac{\dot{m}_{eg}\sqrt{T_{ti}}}{P_{to}}\right)\left(\frac{\omega_T}{\sqrt{T_{ti}}}\right)\right) \quad (82\text{-}2)$$

The controller 78 may also be programmed with a second lookup table 84 correlating the rotational speed $\omega_T$ of the rotating assembly 37 to a corrected mass flow-rate $$Q_c = \frac{\dot{m}_{af}\sqrt{T_{ci}}}{P_{ci}}$$

of the airflow 32 through the compressor scroll 56 and a compressor pressure ratio $P_{Crt}$. The terms $T_{ci}$ and $P_{ci}$ represent compressor inlet temperature and compressor inlet pressure, that are measured by corresponding sensors. The compressor pressure ratio $P_{Crt}$ is generally defined as the compressor scroll 56 outlet pressure divided by the compressor scroll intlet pressure. The second lookup table 84 may be compiled empirically during testing of the turbocharger 36 on a test stand or as part of the engine 10. The controller 78 may be further configured to determine a current rotational speed $\omega_T$ of the rotating assembly 37 via accessing the second lookup table 84.

As discussed above, the compressor scroll 56 defines the compressor inlet 56-1 and the compressor outlet 56-2. In a separate embodiment, the controller 78 may be configured to also base the determination of the pressure $P_{ti}$ on compressor scroll 56 operating parameters at the compressor inlet 56-1 and at the compressor outlet 56-2. To support such an embodiment, the engine 10 may additionally include a third sensor 86 configured to detect a temperature $T_{co}$ at the compressor outlet 56-2 and a fourth sensor 88 configured to detect a pressure $P_{co}$ at the compressor outlet 56-2. Also, the engine 10 may include a fifth sensor 90 configured to detect a pressure $P_{ci}$ at the compressor inlet 56-1. In such an embodiment, the controller 78 is additionally in communication with the third, fourth and fifth sensors 86, 88, and 90. The controller 78 may then be configured to determine the turbine inlet pressure $P_{ti}$ in response to the detected temperature $T_{co}$ at the compressor outlet 56-2, pressure at the compressor outlet $P_{co}$, and pressure at the compressor inlet $P_{ci}$.

The controller 78 may be further configured to determine a power $PW_c$ of the compressor employing the compressor wheel 52, and then determine the turbine inlet pressure $P_{ti}$ in response to the determined power $PW_c$ of the compressor wheel 52. The compressor power $PW_c$ may be determined either from a polynomial equation or from a lookup table. The compressor power $PW_c$ is related to the enthalpy of the compressor multiplied by a compressor power function. The compressor power $PW_c$ may be determined according to the following expression:

$$PW_c = v \cdot k_c \cdot r_c(P_{rc}, Q_c)$$

In the above expression of the compressor power $PW_c$, the term $h_c$ is the enthalpy of the compressor and v is a correction factor based upon the enthalpy of the turbine using the turbine wheel 46, which delivers power to the compressor using the compressor wheel 52. Additionally, the term $r_c$ is a compressor power transfer rate function determined from the compressor pressure ratio, $P_{rc}$, generally expressed as $P_{co}/P_{ci}$ (wherein $P_{ci}$ is the compressor inlet pressure), and the corrected compressor mass flow-rate $Q_c$.

An embodiment 82-3 of the second order polynomial function 82 using the determined compressor power $PW_c$ may be expressed and programmed into the controller 78 as follows:

$$P_{ti} = P_{to}\left(a_0 + a_1\left(\frac{\dot{m}_{eg}\sqrt{T_{ti}}}{P_{to}}\right) + a_2 PW_C + a_3\left(\frac{\dot{m}_{eg}\sqrt{T_{ti}}}{P_{to}}\right)^2 + a_4(PW_C)^2 + a_5\left(\frac{\dot{m}_{eg}\sqrt{T_{ti}}}{P_{to}}\right)PW_C\right)$$

Alternatively, the controller 78 may be programmed with a third lookup table 92 correlating the compressor wheel power $PW_c$ to a corrected rotational speed $$\left(\frac{\omega_T}{\sqrt{T_{ci}}}\right)$$

of the rotating assembly 37 and the corrected compressor mass flow-rate $Q_c$. The third lookup table 92 may be compiled empirically during testing of the turbocharger 36 alone or as part of the engine 10. The controller 78 may be further configured to determine the compressor wheel power PW via the third lookup table 92.

Figure 4:
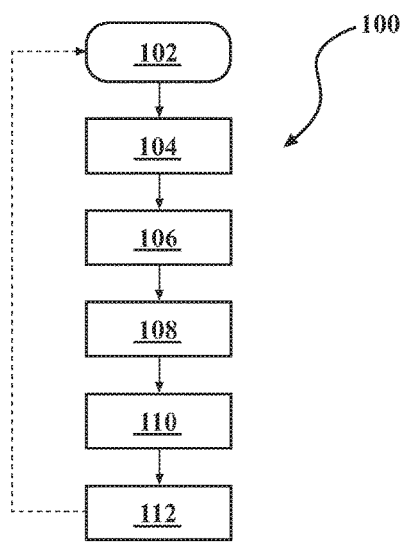
FIG. 4 is a flow diagram of a method of controlling the internal combustion engine shown in FIG. 1.

FIG. 4 depicts a method 100 of controlling the internal combustion engine 10, as described above with respect to FIGS. 1-3. The method initiates in frame 102, where it includes detecting, via the controller 78, an operation of the engine 10 and the turbocharger 36 generating boost, i.e., the pressurized airflow 32A. After frame 102, the method advances to frame 104 where the method includes detecting, via the first sensor 74, the pressure $P_{to}$ at the turbine outlet 48-2. Following frame 104, the method proceeds to frame 106. In frame 106, the method includes detecting, via the second sensor 76, the temperature $T_{ti}$ at the turbine inlet 48-1. Then, the method moves on to frame 108. In frame 108, the method includes determining, via the controller 78, the effective area $A_{wg}$ of the waste-gate opening 64 and the mass flow-rate $\dot{m}_{eg}$ of the exhaust gas 24.

After frame 108, the method advances to frame 110. In frame 110, the method includes determining, via the controller 78, the turbine inlet pressure $P_{ti}$ in response to the detected turbine outlet pressure $P_{to}$ and turbine inlet temperature $T_{ti}$, and the determined waste-gate opening effective area $A_{wg}$ and exhaust gas mass flow-rate $\dot{m}_{eg}$. Following frame 110, the method proceeds to frame 112, where the method includes commanding, via the controller 78, the fuel injector 21 to supply the amount of fuel to the cylinder 14 that corresponds to mass of the airflow 32 channeled into the cylinders, which is affected by, and, therefore, also corresponds to the determined turbine inlet pressure $P_{ti}$. The method 100 may be accomplished either via the controller 78 accessing the respective first, second, or third lookup tables 80, 84, 92, respectively, as described above with respect to FIGS. 1-3.

Alternatively, the method may be accomplished via direct computation using the second order polynomial function 82 using the possible polynomial function embodiments discussed above. The method 100 may operate in a continuous loop, i.e., following the supplying of fuel to the cylinder 14 that corresponds to mass of the airflow 32 channeled into the cylinders and to the determined turbine inlet pressure $P_{ti}$, the method may loop back to frame 102 to continue detecting the pressurized airflow 32A being generated by the turbocharger 36 to continuously determine the turbine inlet pressure $P_{ti}$ and supply the appropriate amount of fuel.

Overall, the method 100 is intended to determine the turbine inlet pressure $P_{ti}$ for the turbocharger 36, either by using the second order polynomial function 82 or one of the lookup tables 80, 84, 92, in lieu of a direct physical detection of the turbine inlet pressure parameter. Such a determination of the turbine inlet pressure $P_{ti}$ effectively provides a virtual turbine inlet pressure sensor for use by the controller 78, thereby facilitating accurate control of the operation of engine 10 without using a dedicated physical inlet pressure sensor.

The detailed description and the drawings or figures are supportive and descriptive of the disclosure, but the scope of the disclosure is defined solely by the claims. While some of the best modes and other embodiments for carrying out the claimed disclosure have been described in detail, various alternative designs and embodiments exist for practicing the disclosure defined in the appended claims. Furthermore, the embodiments shown in the drawings or the characteristics of various embodiments mentioned in the present description are not necessarily to be understood as embodiments independent of each other. Rather, it is possible that each of the characteristics described in one of the examples of an embodiment may be combined with one or a plurality of other desired characteristics from other embodiments, resulting in other embodiments not described in words or by reference to the drawings. Accordingly, such other embodiments fall within the framework of the scope of the appended claims.

What is claimed is:

1. An internal combustion engine comprising:
   a cylinder configured to receive a mixture of air and fuel for combustion therein and expel an exhaust gas following the combustion;
   a fuel injector configured to supply the fuel;
   a turbocharger configured to receive ambient air and generate a pressurized airflow for delivery to the cylinder, wherein the turbocharger includes: a compressor scroll;
   a turbine scroll defining a turbine inlet and a turbine outlet;
   a rotating assembly driven by the exhaust gas and having a turbine wheel disposed inside the turbine scroll and a compressor wheel disposed inside the compressor scroll; and
   a waste-gate defining an opening configured to selectively redirect at least a portion of the exhaust gas to the turbine outlet bypassing the turbine wheel;
   a first sensor configured to detect a pressure at the turbine outlet;
   a second sensor configured to detect a temperature at the turbine inlet; and
   a controller configured to determine the pressure at the turbine inlet using a second order polynomial function configured to:
   determine an effective area of the waste-gate opening and a mass flow-rate of the exhaust gas;
   determine a pressure at the turbine inlet in response to the detected pressure at the turbine outlet and temperature at the turbine inlet, and the determined effective area of the waste-gate opening and mass flow-rate of the exhaust gas; and
   command the fuel injector to supply an amount of fuel to the cylinder corresponding to the pressurized airflow as affected by the determined pressure at the turbine inlet.

2. The engine of claim 1, wherein the controller is programmed with a first lookup table correlating the turbine inlet pressure to the detected pressure at the turbine outlet and temperature at the turbine inlet, and the determined effective area of the waste-gate opening and mass flow-rate of the exhaust gas, and wherein the controller is further configured to determine the pressure at the turbine inlet via the first lookup table.

3. The engine of claim 1, wherein the second order polynomial function includes a factor indicative of the determined effective area of the waste-gate opening.

4. The engine of claim 3, wherein the waste-gate includes a variable position valve configured to regulate the effective area of the waste-gate opening, and wherein the factor indicative of the determined effective area of the waste-gate opening is defined by a current position of the valve.

5. The engine of claim 1, wherein the rotating assembly is driven by the exhaust gas at a rotational speed, and wherein the second order polynomial function includes a factor indicative of the rotational speed of the rotating assembly.

6. The engine of claim 5, wherein the controller is programmed with a second lookup table correlating the rotational speed of the rotating assembly to a mass flow-rate of air through the compressor and a compressor pressure ratio, and wherein the controller is further configured to determine a current rotational speed of the rotating assembly via the second lookup table.

7. The engine of claim 1, wherein the compressor scroll defines a compressor inlet and a compressor outlet, the engine further comprising:
   a third sensor configured to detect a temperature at the compressor outlet; a fourth sensor configured to detect a pressure at the compressor outlet; a fifth sensor configured to detect a pressure at the compressor inlet; and wherein the controller is further configured to determine the pressure at the turbine inlet in response to the detected temperature and pressure at the compressor outlet, and the detected pressure at the compressor inlet.

8. The engine of claim 1, wherein the compressor scroll defines a compressor inlet and a compressor outlet, and wherein the controller is further configured to:
   determine a power of the compressor wheel; and determine the pressure at the turbine inlet in response to the determined power of the compressor wheel.

9. The engine of claim 8, wherein the controller is programmed with a third lookup table correlating the power of the compressor wheel to a corrected rotational speed of the rotating assembly and a corrected mass flow-rate of air through the compressor, and wherein the controller is further configured to determine the power of the compressor wheel via the third lookup table.

10. A method of controlling an internal combustion engine having a cylinder configured to receive a mixture of air and fuel for combustion therein and expel an exhaust gas following the combustion, a fuel injector configured to supply the fuel, and a turbocharger configured to receive ambient air and generate a pressurized airflow for delivery to the cylinder, wherein the turbocharger includes:
   a compressor scroll;
   a turbine scroll defining a turbine inlet and a turbine outlet;
   a rotating assembly driven by the exhaust gas and having a turbine wheel disposed inside the turbine scroll and a compressor wheel disposed inside the compressor scroll; and
   a waste-gate defining an opening configured to selectively redirect at least a portion of the exhaust gas to the turbine outlet bypassing the turbine wheel;
   the method comprising:
   detecting, via a first sensor, a pressure at the turbine outlet;
   detecting, via a second sensor, a temperature at the turbine inlet;
   determining, via a controller, an effective area of the waste-gate opening and a mass flow-rate of the exhaust gas;
   determining, via the controller using a second order polynomial function, a pressure at the turbine inlet in response to the detected pressure at the turbine outlet and temperature at the turbine inlet, and the determined effective area of the waste-gate opening and mass flow-rate of the exhaust gas; and
   commanding, via the controller, the fuel injector to supply an amount of fuel to the cylinder corresponding to the pressurized airflow as affected by the determined pressure at the turbine inlet.

11. The method of claim 10, wherein the controller is programmed with a first lookup table correlating the turbine inlet pressure to the detected pressure at the turbine outlet and temperature at the turbine inlet, and the determined effective area of the waste-gate opening and mass flow-rate of the exhaust gas, the method further comprising accomplishing said determining the pressure at the turbine inlet via the first lookup table.

12. The method of claim 1, further comprising using a factor indicative of the determined effective area of the waste-gate opening in the second order polynomial function.

13. The method of claim 12, wherein the waste-gate includes a variable position valve configured to regulate the effective area of the waste-gate opening, and wherein the factor indicative of the determined effective area of the waste-gate opening is defined by a current position of the valve.

14. The method of claim 1, wherein the rotating assembly is driven by the exhaust gas at a rotational speed, further comprising using a factor indicative of the rotational speed of the rotating assembly in the second order polynomial function.

15. The method of claim 14, wherein the controller is programmed with a second lookup table correlating the rotational speed of the rotating assembly to a mass flow-rate of air through the compressor and a compressor pressure ratio, the method further comprising
determining, via the controller, a current rotational speed of the rotating assembly via the second lookup table.

16. The method of claim 10, wherein the compressor scroll defines a compressor inlet and a compressor outlet, the method further comprising:
detecting, via a third sensor, a temperature at the compressor outlet;
detecting, via a fourth sensor, a pressure at the compressor outlet;
detecting, via a fifth sensor, a pressure at the compressor inlet; and
determining, via the controller, the pressure at the turbine inlet in response to the detected temperature and pressure at the compressor outlet, and the detected pressure at the compressor inlet.

17. The method of claim 10, wherein the compressor scroll defines a compressor a compressor outlet, the method further comprising:
determining, via the controller, a power of the compressor wheel;
determining, via the controller, the pressure at the turbine inlet in response to the determined power of the compressor wheel.

18. The method of claim 17, wherein the controller is programmed with a third lookup table correlating the power of the compressor wheel to a rotational speed of the rotating assembly and a corrected mass flow-rate of air through the compressor, the method further comprising determining, via the controller, the power of the compressor wheel using the third lookup table.

* * * * *